United States Patent [19]

Shibata

[11] 4,016,945
[45] Apr. 12, 1977

[54] MOTORCYCLE WITH A WATER COOLED ENGINE

[75] Inventor: Hirotaka Shibata, Hamamatsu, Japan

[73] Assignee: Yamaha, Hatsudoki Kabushiki Kaisha, Iwata, Japan

[22] Filed: Mar. 3, 1976

[21] Appl. No.: 663,441

[30] Foreign Application Priority Data

Mar. 6, 1975 Japan .............................. 50-27296

[52] U.S. Cl. ............................ 180/33 R; 180/68 R
[51] Int. Cl.² .................. B60K 11/04; B62K 11/00
[58] Field of Search ................ 180/33 R, 33 A, 30, 180/68 R, 31, 26 R; 165/41–44; 293/61, 69

[56] References Cited

UNITED STATES PATENTS

| 1,858,743 | 5/1932 | Langstreth | 180/33 R |
| 2,781,859 | 2/1957 | Warren | 180/33 R |
| 3,612,204 | 10/1971 | Allen | 180/43 R |

FOREIGN PATENTS OR APPLICATIONS 18,911  8/1914  United Kingdom ................. 165/41

Primary Examiner—Kenneth H. Betts
Attorney, Agent, or Firm—Donald D. Mon

[57] ABSTRACT

A motorcycle driven by a water cooled engine mounted on a frame includes a radiator attached to a front fork rotated with a handle. A water circulating system between the engine and the radiator is constructed by a head pipe and a steering shaft rotatably inserted through the head pipe.

6 Claims, 4 Drawing Figures

MOTORCYCLE WITH A WATER COOLED ENGINE

BACKGROUND OF THE INVENTION

This invention relates to a motorcycle driven by a water cooled engine, and more particularly to a motorcycle in which a radiator is attached to a front fork of the motorcycle.

A motorcycle loaded with a water cooled engine is provided with a radiator in the proximity of the engine, that is, in the neighborhood of a front side of the engine. Since, however, this water cooled engine is mostly adopted for a cross-country race type motorcycle travelling on a bad road, its heat-exchanging performance decreases due to the entry of mud and dust into the radiator and the radiator is damaged owing to the abutment thereon of small stones, rocks or the like.

SUMMARY OF THE INVENTION

For purpose of eliminating the drawbacks resulting from the provision of said radiator in the vicinity of the engine it is considered to simply attach the radiator to the front fork of the motorcycle. In this case, however, the position of the radiator attached to the front fork rockable integrally with a control handle is always varied with the handle control operation relatively to the engine mounted on a frame of the motorcycle. Accordingly, even though the engine and radiator are permitted to communicate with each other by means of an elastically deformable or contractible and expansible hose, this hose is elastically deformed each time the handle operation is carried out, and therefore with an extremely increasing frequency. As a result, the material quality of the hose is not only deteriorated, followed by a decrease in the hose durability, but, since the handle operation is required to be performed against the elastic force of the hose, it also becomes difficult to conduct a smooth end quick handle operation.

Accordingly, the object of the invention is to provide a motorcycle with a water cooled engine which durability is increased, and in which handle operation can be smoothly carried out, by attaching a radiator to a front fork of the motorcycle and forming a cooling water circulating passageway between the radiator and the engine through utilizing a mutual rocking mechanism section between a head pipe and a steering shaft.

BRIEF DESCRIPTION OF THE DRAWING

FIGS. 1 to 4 show a motorcycle with a water cooled engine according to an embodiment of the invention, wherein FIG. 1 is a side view schematically showing the whole of the motorcycle, FIG. 2 a side view showing a steering mechanism and a radiator of the motorcycle, FIG. 3 a sectional view taken along the line III—III of FIG. 2 and FIG. 4 a sectional view taken along the lines IV—IV of FIG. 3 wherein a racing number plate is omitted.

PREFERRED EMBODIMENT OF THE INVENTION

Figure 1:
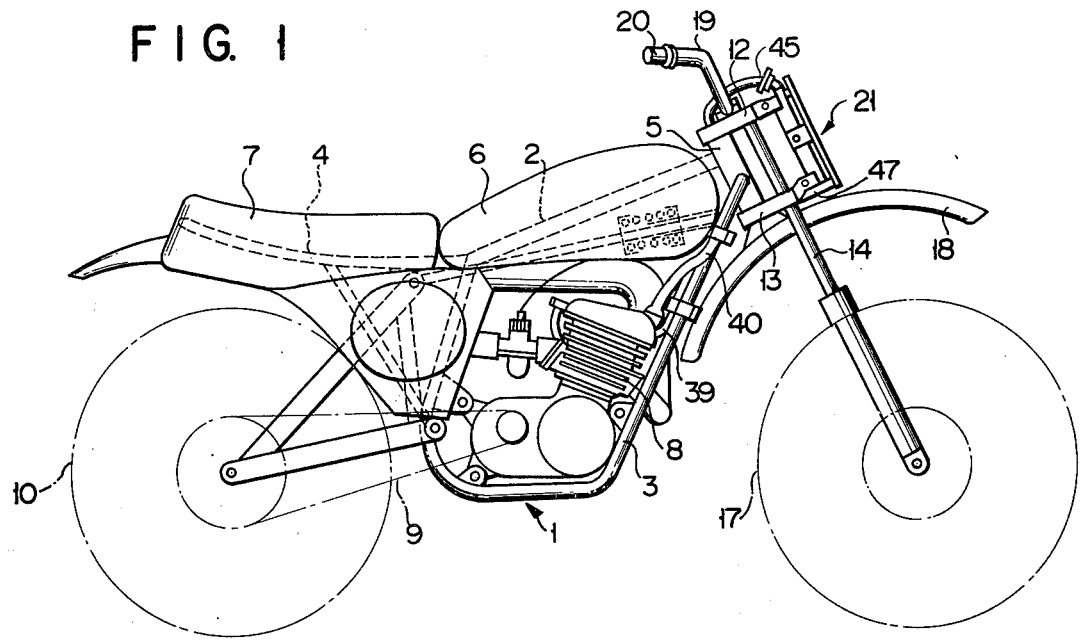
Figure 2:
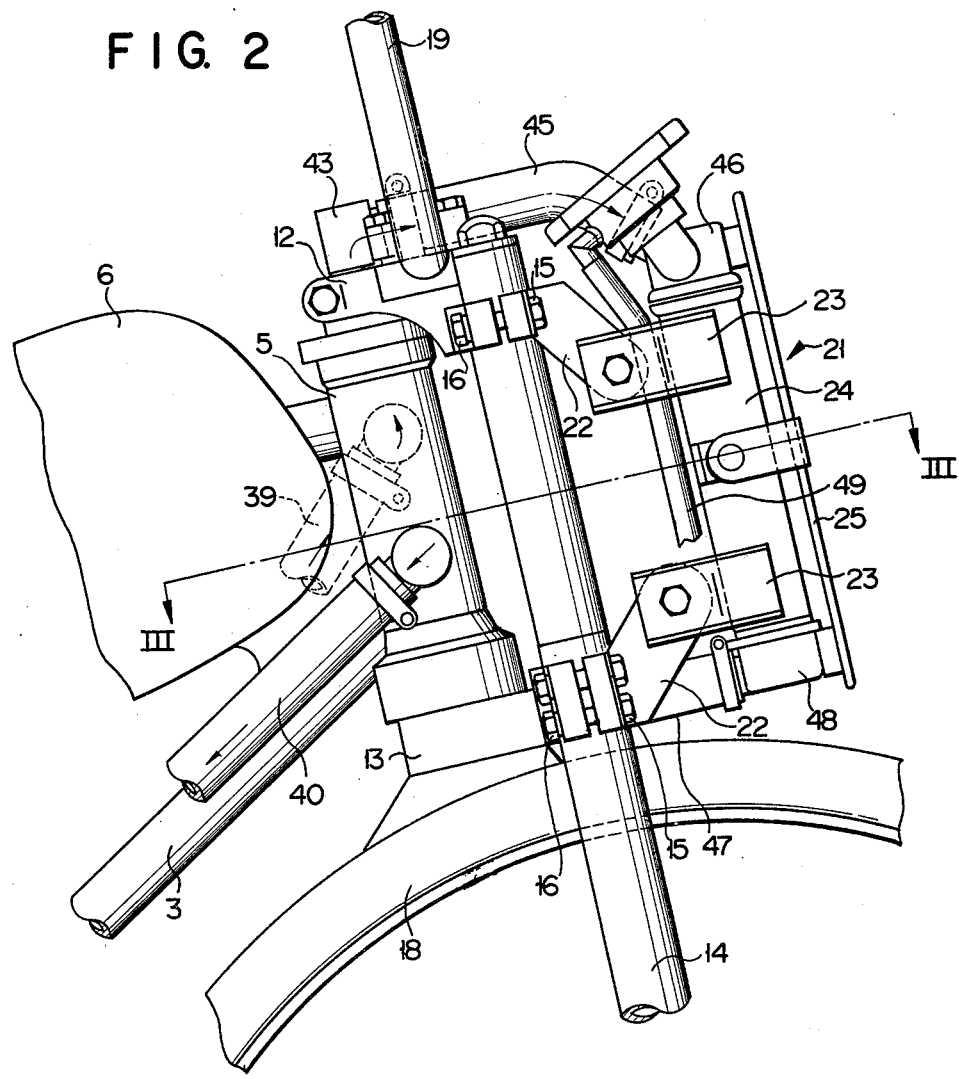
Figure 3:
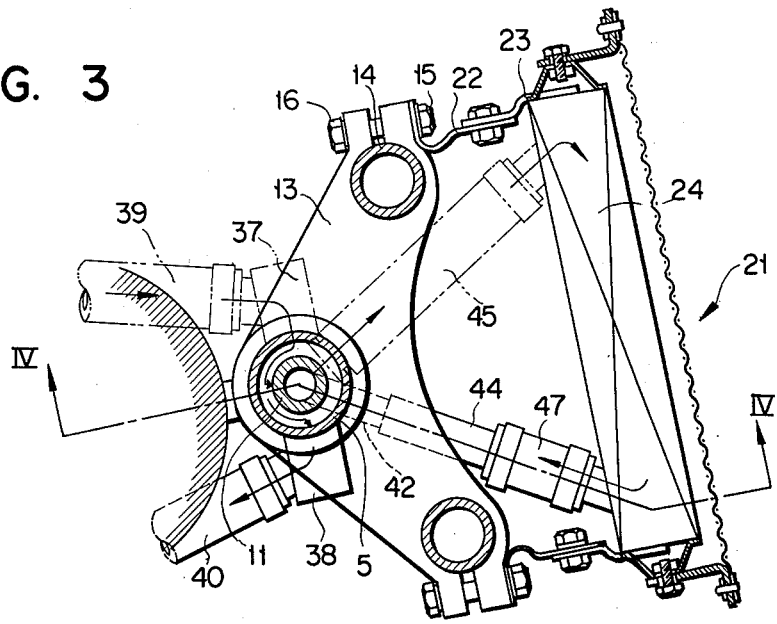
Figure 4:
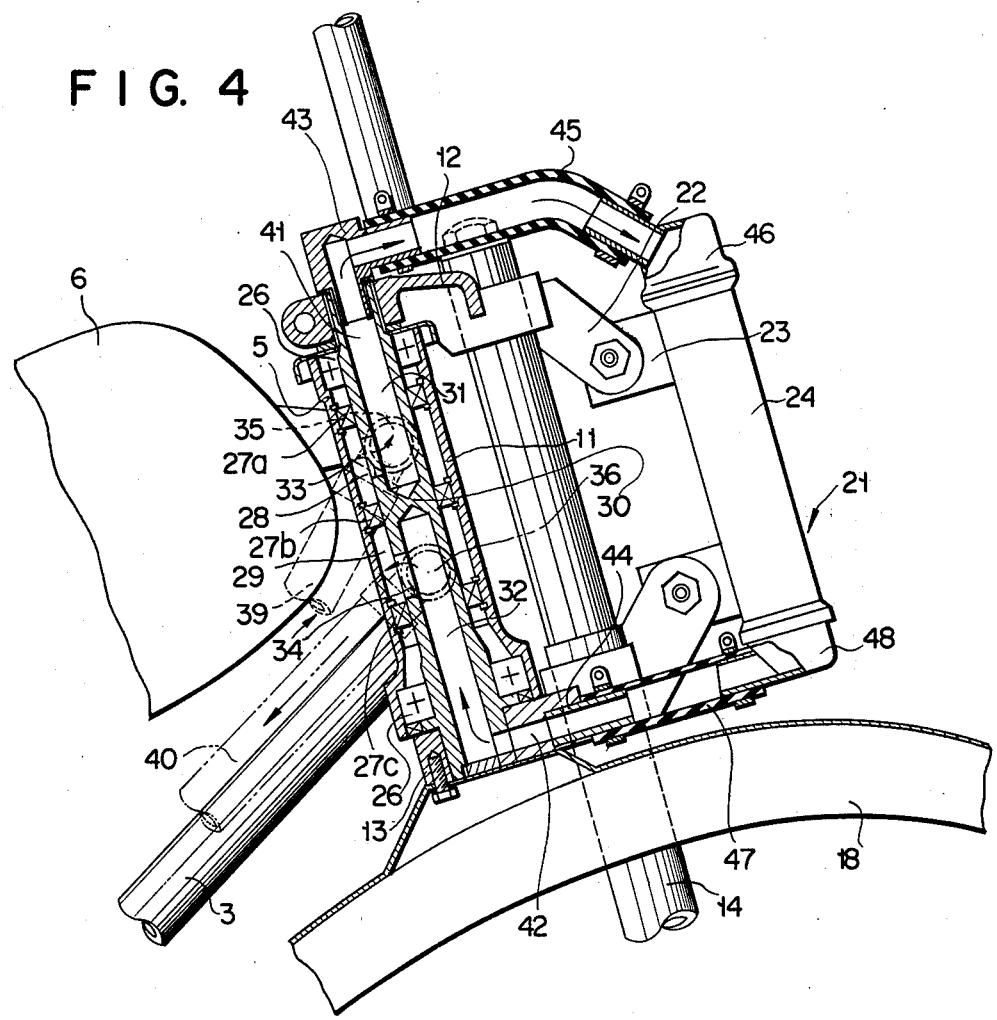

An embodiment of the invention is hereinafter explained with reference to the accompanying drawings.

Throughout the Figures, a reference numeral 1 denotes a frame of a motorcycle, said frame 1 being constructed by mutually joining pipe members such as a main pipe 2, down tubes 3 and seat rails 4. Forward ends of the main pipe 2 and down tubes 3 are integrally connected to a substantially vertical head pipe 5, for example, by welding. On the main pipe 2 of the frame 1 a fuel tank 6 is disposed in a manner that it seats itself astride the main pipe 2, and on the rearside of the fuel tank 6 a seat 7 is disposed on the seat rails 4. Beneath the main pipe 2 is provided a water cooled engine 8. The driving force of the engine 8 is transmitted to a rear wheel 10 through a clutch, a transmission and a chain 9 each of which is well known and not shown in detail.

To the head pipe 5 is attached a later described steering shaft 11 to be rockable about a center axis of the pipe 5. To upper and lower ends of the steering shaft 11 are integrally secured upper and lower brackets 12, 13, respectively, whose flat planes are substantially triangular. To forward ends of the upper and lower brackets 12, 13 are integrally secured a front fork 14, respectively, on the right and left sides of the forward end of each bracket, for example, by bolts 15 and nuts 16. The lower end of the front fork 14 is extended to the lower part of a forward section of the motorcycle and a front wheel 17 is rotatably pivoted by the tip end of said front fork 14. Note that a reference numeral 18 designates a front fender fitted to the front fork 14 along an upper part of the front wheel 17 so as to rock jointly with the front fork 14. To the upper bracket 12 is fixed a control handle 19 which is provided with manually operable devices such as an axle grip 20, clutch lever not shown, etc. Accordingly, when the control handle 19 is subjected to control operation, the front fork 14 is rocked about the steering shaft 11 through the upper and lower brackets 12, 13 to permit the front wheel 17 and front fender 18 to be rocked accordingly.

To an upper part of the front fork 14 a flat radiator 21 is fitted parallel to the fork 14 above the front fender 18. To tip ends of the upper and lower brackets 12, 13, respectively, a pair of supports 22 are fixedly attached utilizing said bolts 15 and nuts 16 for securing the fork 14. Through mutually fastening the supports 22 and stays 23 fastened to the radiator 21 by means of, for example, bolts, the radiator 21 is connected to the brackets 12, 13. A reference numeral 25 denotes a racing number plate provided on a front face of the radiator 21, said racing number plate, constructed by, for example, metal netting, punching metal etc. so as to act as a protector for the radiator 21.

A cooling water circulating system for communication between the engine 8 and radiator 21 disposed in the above-mentioned manner is constructed as follows. The steering shaft 11 is inserted through the head pipe 5 and is rotatably supported by journal bearings 26 mounted on the upper and lower opening ends of the pipe 5, so that a clearance is formed between the inner peripheral surface of the head pipe 5 and the outer peripheral surface of the steering shaft 11.

This clearance is divided into two liquid-tightly sealed chambers, that is a flow-in side liquid chamber 28 defined by the head pipe 5, the steering shaft 11, an upper water seal member 27a and an intermediate water seal member 27b, and a flow-out side liquid chamber 29 defined by the head pipe 5, the steering shaft 11, the intermediate water seal member 27b and a lower water seal member 27c. Thus, the flow-in side liquid chamber 28 is located above the flow-out side liquid chamber 29 through the intermediate water seal member 27b along the central axis of the head pipe 5. Further, the steering shaft 11 assumes a hollow pipe like configuration, having a partition wall 30 at an intermediate position of its entire longitudinal length. An upper half of said steering shaft 11 constitutes a flow-in side liquid passageway 31 while a lower half thereof constitutes a flow-out side liquid passageway 32. The flow-in side liquid chamber 28 and the flow-in side liquid passageway 31 communicate with each other through a flow-in side communication bore 33 formed in the peripheral wall of the steering shaft 11, and the flow-out side liquid chamber 29 and the flow-out side liquid passageway 32 communicate with each other through a flow-out side communication bore 34 formed in the peripheral wall of the steering shaft 11. Further, the head pipe 5 is formed at its peripheral wall with a flow-in vent 35 communicating with the flow-in side liquid chamber 28 and is similarly formed at its peripheral wall with a flow-out vent 36 communicating with the flow-out side chamber 29. To the flow-in vent 35 and to the flow-out vent 36 are connected, respectively, a pair of pipe joints 37, 38, to which are connected at one end a flowing-in pipe or hose 39 and a flowing-out pipe or hose 40. The other end of the flowing-in pipe 39 is connected to the outlet of a water jacket not shown of the engine 8 and the other end of the flowing-out pipe 40 is connected to the inlet of the water jacket of the engine 8 through a water pump (not shown). The upper and lower ends of the steering shaft 11 are projectively extended, respectively, from the upper and lower ends of the head pipe 5, and are provided with a flow-out port 41 communicating with the flow-in side liquid passageway 31 and a flow-in port 42 communicating with the flow-out side liquid passageway 32 and formed in the lower bracket 13. The flow-out port 41 and the flow-in port 42 are fitted with pipe joints 43, 44, respectively. To the pipe joint 43 fitted to the flow-out port 41 is connected one end of a flowing-out hose or pipe 45, the other end of which is connected to an upper water tank 46 of the radiator 21. To the pipe joint 44 fitted to the flow-in port 42 is connected one end of another flowing-out hose or pipe 47, the other end of which is connected to a lower water tank 48 of the radiator 21. Note that a reference numeral 49 denotes an overflow pipe and that said parts and sections referred to in this embodiment are named as constituting a cooling water or liquid circulating system based mainly on the head pipe 5 and steering shaft 11 and that the wordings "flow-in" and "flow-out" mean the flow in the members 5, 11 and the flow out of the members 5, 11.

The operation of said embodiment having the foregoing construction is now explained.

According to the foregoing construction, the cooling water circulating system is formed between the water cooled engine 8 and the radiator 21. That is, the engine 8 communicates with the flow-in side liquid chamber 28 within the head pipe 5 through the flow-in pipe 39 communicating with the outlet of the water jacket of the engine 8, and the flow-in side liquid chamber 28 communicates with the flow-in side liquid passageway 31 within the steering shaft 11 through the flow-in side communication bore 33, and the passageway 31 communicates with the radiator 21 through the flowing-out hose 45. The radiator 21 communicates with the flow-out side liquid passageway 32 within the steering shaft 11 through the flowing-in hose 47, and the flow-out side liquid passageway 32 communicates with the flow-out side liquid chamber 29 within the head pipe 5 through the flow-out side communication bore 34. This liquid chamber 29 communicates with the inlet of the water pump (not shown) of the engine 8 through the flowing-out pipe 40. Accordingly, the cooling water in the circulating system flows as indicated by the following arrows. Engine 8 → flowing-out pipe 39 → flow-in side liquid chamber 28 within the head pipe 5 → flow-in side liquid passageway 31 within the steering shaft 11 → flowing-out hose 45 → radiator 21 → flowing-in hose 47 → flow-out side liquid passageway 32 within the steering shaft 11 → flowing out side liquid chamber 29 within the head pipe 5 → flowing-out pipe 40 → water pump → engine 8. A high temperature-cooling water having deprived the engine 8 of its heat is sent to the radiator 21 and allowed to cool therein, and this low temperature-cooling water is sent to the engine 8, thus to perform the engine cooling operation.

In the above-mentioned cooling water circulating system, the flow-in side liquid chamber 28 and flow-out side liquid chamber 29 are formed between the head pipe 5 made integral with the frame 1 and the steering shaft 11 fitted into and rockably supported by the head pipe 5 and the flow-in side liquid passageway 31 and flow-out side liquid passageway 32 are formed within the steering shaft 11, and the communications between the liquid chamber 28 and liquid passageway 31 and between the liquid chamber 29 and liquid passageway 32 are rendered effective by means of the communication bores 33 and 34, respectively. For this reason, even when the steering shaft 11 is rocked relatively to the head pipe 5 by the rocking operation of the control handle 19, the communications between the flow-in side liquid chamber 28 and liquid passageway 31 and between the flow-out side liquid chamber 29 and liquid passageway 32 are always effective. Therefore, said cooling water circulating system is never interrupted. Furthermore, when the steering shaft 11 is rocked relatively to the head pipe 5 by rocking the control handle 19, there is little resistance, and since the viscosity resistance of the cooling water is almost negligible if there is any, the handle operation can be conducted very smoothly, so that it can be conducted also quickly. Furthermore, the radiator 21 is provided for the upper part of the front fork 14 integrally therewith, so that it is always faced just against the direction of travel wind in accordance with the control operation of the handle 19 thereby increasing the cooling efficiency. As a result, the radiator can be miniaturized and decreased in weight.

The above-mentioned embodiment referred to the case where the flow-in side liquid chamber 28 and the flow-out side liquid chamber 29 were disposed longitudinally of the head pipe 5; and the flow-in side liquid passageway 31 and flow-out liquid passageway 32 were disposed separated from each other laterally of the steering shaft 11. This invention is not limited thereto, but, for example, the flow-in side liquid chamber and flow-out side liquid chamber may be formed by dividing the head pipe longitudinally thereof while the flow-in side liquid passageway and flow-out side liquid passageway may be formed by similarly dividing the steering shaft longitudinally thereof. Further the attachment position for attaching the radiator to the front fork of the motorcycle is not limited to the upper part of this front fork.

What is claimed is:

1. A motorcycle with a water cooled engine comprising a frame having a head pipe at one end, a water cooled engine fitted to said frame, a steering shaft rotatably inserted through said head pipe, a control handle and a front fork for supporting a front wheel of said motorcycle, fixed to said steering shaft, a radiator fitted to said front fork, a flow-in side liquid chamber and flow-out side liquid chamber defined by the inner periphery of said head pipe and the outer periphery of said steering shaft separately from each other, a flow-in side liquid passageway and flow-out side liquid passageway formed in said steering shaft separately from each other, a pair of communication bores formed in said steering shaft respectively communicating between said flow-in side liquid chamber and flow-in side liquid passageway and between said flow-out side liquid chamber and flow-out side liquid passageway, first and second tubes connecting said liquid chambers to said water cooled engine, respectively, and third and fourth tubes connecting both said liquid passageways to said radiator, respectively, whereby cooling water within said radiator circulates to pass through said fourth tube, flow-out liquid passageway, flow-out side liquid chamber, second tube, water-cooled engine, first tube, flow-in side liquid chamber, flow-in side liquid passageway and third tube to return to said radiator.

2. A motorcycle according to claim 1, wherein said radiator is mounted on an upper end portion of said front fork.

3. A motorcycle according to claim 2, wherein said radiator is positioned parallel to said head pipe; said third tube is connected between an end of said radiator and an end of said flow-in side liquid passageway; and said fourth tube is connected between the other end of said radiator and an end of said flow-out side liquid passageway.

4. A motorcycle according to claim 2, wherein said front fork is fitted with a racing number adjacent to a front face of said radiator.

5. A motorcycle according to claim 2, wherein said front fork is fitted with a front fender below said radiator.

6. A motorcycle according to claim 1, wherein said flow-in side liquid chamber is defined between an upper seal member provided within an end of said head pipe and an intermediate seal member provided at an intermediate portion of said head pipe; and said flow-out side liquid chamber is defined between a lower seal member provided within the other end of said head pipe and said intermediate seal member.

* * * * *